US00RE42421E

(19) United States
(12) Reissued Patent
Toida et al.

(10) Patent Number: US RE42,421 E
(45) Date of Reissued Patent: Jun. 7, 2011

(54) INSULATED CUP HOLDER

(75) Inventors: Shouji Toida, Schaumburg, IL (US); Yasuhiro Murakami, Roselle, IL (US); John Bergeron, Barrington, IL (US)

(73) Assignee: Thermos L.L.C., Rolling Meadows, IL (US)

(21) Appl. No.: 10/345,595

(22) Filed: Jan. 16, 2003

Related U.S. Patent Documents

Reissue of:

(64) Patent No.: 6,367,652
Issued: Apr. 9, 2002
Appl. No.: 09/774,410
Filed: Jan. 31, 2001

(51) Int. Cl.
*B65D 25/20* (2006.01)

(52) U.S. Cl. ..... 220/739; 220/592.26; 220/592.16

(58) Field of Classification Search ..... 220/739
See application file for complete search history.

(56) References Cited

U.S. PATENT DOCUMENTS

| | | | | | |
|---|---|---|---|---|---|
| 163,203 | A | * | 5/1875 | Howes | 220/592.28 |
| 3,596,795 | A | * | 8/1971 | D'Ercoli | 206/514 |
| 4,974,741 | A | * | 12/1990 | Gustafson et al. | 220/739 |
| 5,040,719 | A | * | 8/1991 | Ballway | 220/738 |
| 5,052,649 | A | * | 10/1991 | Hunnicutt | 248/311.2 |
| D380,650 | S | * | 7/1997 | Norris | D7/619.1 |
| 5,645,196 | A | * | 7/1997 | Hancuff | 222/183 |
| 5,660,326 | A | * | 8/1997 | Varano et al. | 229/403 |

* cited by examiner

*Primary Examiner* — Stephen Castellano
(74) *Attorney, Agent, or Firm* — Wood, Phillips, Katz, Clark & Mortimer

(57) ABSTRACT

A cup holder for a conventional beverage cup that has a generally inverted frusto-conical side wall and an upper access opening surrounded by a radially outwardly extending peripheral bead adapted to be connected to a disposable lid by a snap fit within a downwardly and radially outwardly depending peripheral skirt on the lid. The insulated cup holder includes a double walled insulating vessel including an inner liner and an outer liner spaced therefrom to define an insulating space and snugly receives a conventional cup so as to insulate the contents of the cup to assist in maintaining its temperature at a desired level.

18 Claims, 2 Drawing Sheets

INSULATED CUP HOLDER

Matter enclosed in heavy brackets [ ] appears in the original patent but forms no part of this reissue specification; matter printed in italics indicates the additions made by reissue.

FIELD OF THE INVENTION

This invention relates to cup holders, and more specifically, to insulated cup holders for disposable beverage cups.

BACKGROUND OF THE INVENTION

Recent years have seen an explosion in the use of so-called travel mugs. A typical travel mug is a vessel that includes an inner shell and an outer shell which are spaced from one another by a vacuum or insulating space. A removable lid is secured on the resulting assembly and typically is provided with a sip opening as well as a vent opening. A beverage may be introduced into the travel mug where its temperature, whether hot or cold, is maintained by the insulating qualities of the mug. A beverage may be consumed by extracting the same through the sip hole. Mugs of this sort are commonly used in vehicles as well as by pedestrians moving from one location to another.

At the same time, there has likewise been an explosion in the over-thecounter vending of beverages of various sorts, specialty coffees being one obvious example. Not infrequently, these beverages are sold in disposable plastic or paper cups that are fitted with lids. The lids conventionally have a sip opening and/or an opening through which a conventional straw may be introduced into the interior of the cup. Unfortunately, the nature of many disposable cups is such that they are incapable of maintaining the temperature of the beverage contained therein at a desired temperature in a manner even approaching that of, for example, travel mugs.

Unfortunately, many vendors of heated or chilled beverages are unwilling to dispense their product into one's personal travel mug, preferring instead to use only disposable cups provided with disposable lids. As a consequence, customers purchasing from such vendors must either pour the contents of a disposable cup into their own personal travel mug or forego the desirable, temperature-retaining characteristics of such mugs.

The present invention is directed to overcoming one or more of the above problems.

SUMMARY OF THE INVENTION

It is a principal object of the invention to provide a new and improved insulated holder for a beverage cup. More specifically, it is an object of the invention to provide an insulated holder for a disposable beverage cup.

An exemplary embodiment of the invention achieves the foregoing object in an insulating cup holder in combination with a disposable beverage container. The disposable beverage container typically has a generally inverted frustoconical side wall and an upper access openings surrounded by a radially, outwardly extending peripheral bead adapted to be connected to a disposable container lid by a snap fit within a downwardly and radially outwardly depending peripheral skirt on the lid. The container, of course, has a bottom, and a double walled insulating vessel is provided which includes an inner lining have a frusto-conical inner surface with a bottom and an upper access opening with a circular edge and shaped to matingly receive the disposable beverage container with the container side wall abutting the surface of the liner about substantially its entire extent. The container is sized so that a radially outer part of the bead is uncovered to be received and snap fitted within the skirt of a disposable lid. An outer body surrounds, in spaced relation, the inner liner. The inner liner and the outer body are sealingly attached to one another thereby defining a vacuum or insulating space between the inner liner and the outer body with the outer body being in non-interfering relation to the placement of a lid on the bead of the container.

In a preferred embodiment, the inner liner is also provided with an axially directed edge surrounding the upper access opening so that the axially extending edge will abut the underside of the bead of the disposable cup while leaving a radially outer part of the bead uncovered to be received and snap fitted within the skirt of a disposable lid. The outer body is sealingly attached to the inner liner just below the axially directed edge thereby defining a vacuum or insulating space between the inner liner and the outer liner as mentioned and without interfering with the placement of the lid on a container within the beverage holder.

Preferably, the axially directed edge is adapted to underlie the skirt of the lid in non-contacting relation.

In one embodiment, the inner liner and the outer body are formed of a metal.

In another embodiment, the inner liner and the outer body are formed of plastic.

One embodiment contemplates that the inner liner include a radially outwardly directed flange located just below the axially extending edge and the bead and that the outer body is sealed to the flange.

A preferred embodiment includes a grip on the outer body located near the top thereof.

In one embodiment of the invention, the container may be suspended within the inner liner by the abutment of the bead and the axially extending flange.

Other objects and advantages will become apparent from the following specification taken in connection with the accompanying drawings.

DESCRIPTION OF THE PREFERRED EMBODIMENTS

Figure 1:
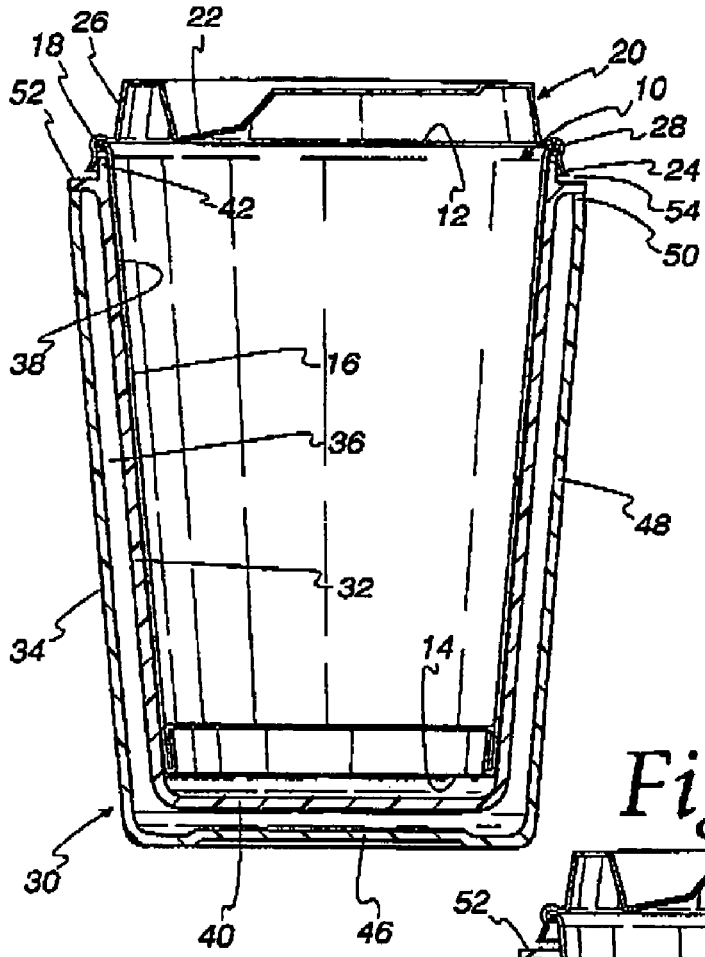
FIG. 1 is a vertical section of one embodiment of an insulated cup holder made according to the invention.

An exemplary embodiment of the invention is illustrated in FIG. 1 and is seen to include a conventional, disposable beverage cup, generally designated 10, made of paper, plastic coated paper, or plastic, depending upon the use to which it is to be put. The cup includes an upper edge 12 and a lower edge 14 together with an inverted frusto-conical side wall 16. At the upper edge 12, the cup 10 includes a conventional, radially outwardly extending, peripheral bead 18. The upper edge 12 and the bead 18 define a circular, upper access opening to the interior of the cup 10 through which a beverage may be introduced into the cup 10 or withdrawn therefrom.

Also illustrated in FIG. 1 is a conventional, disposable beverage cup lid, generally designated 20 which may be of conventional construction. The same includes a depression which may be punched out to provide a sip opening along with a peripheral, radially outwardly directed depending skirt 24 that attaches to a side wall 26 of the lid 20 via a radially inwardly opening, peripheral groove 28 by which the lid 20 may be snap fitted about the bead 18 to be captured on the cup 10.

According to the invention, an insulating cup holder, generally designated 30, is provided. The cup holder 30 is made up of an inner liner 32 surrounded by an outer body or shell 34. The outer body 34 is spaced from the inner liner 32 so as to define an insulating space 36. The insulating space 36 may be filled with an insulating material, may constitute a so-called "dead air" space, or may be evacuated to define a vacuum space as desired.

In the embodiment illustrated in FIG. 1, the inner liner 32 and the outer body 34 are formed of plastic. The inner liner 32 has an interior surface 38 that is in the form of an inverted frusto cone, terminating in one end in a bottom 40 and in and at the opposite end, in an axially directed flange 42. As shown, the surface 38 is sized so as to snugly receive and abut the side wall 16 of the cup 10 over substantially the entire extent of the latter.

The axially extending flange 42 defines a circular, access opening by which the cup 10 may be inserted into the cup holder 30. The width of the flange 42, as illustrated in FIG. 1, is such that the upper edge may abut the underside of the bead 28 without interfering with the snap fit of the lid 20 on the cup 10.

The outer body 34 has a bottom 46, a generally inverted frusto conical side wall 48, and a top, axially extending edge 50.

Returning to the inner liner 32, at a location near its top, and just below the axially extending edge 42, a radially extending, outwardly directed, peripheral flange 52 is located. The flange 52 is such as to just overlie the axially extending edge 50 of the outer body; and at this location, the flange 52 and the upper edge 50 of the outer body 30 are abutted and sealed together to isolate the insulation containing space 36.

It will be observed from FIG. 1 that a small, peripheral space 54 exists between the bottom of the skirt 24 and the upper surface of the flange 52. This gap assures that insertion of the cup 10 with the lid 20 thereon into the cup holder 30 will not dislodge the lid 20 from the cup 10. It also allows the lid 20 to be placed on the cup 10 or removed therefrom while the cup 10 is in the cup holder 30.

In the embodiment illustrated in FIG. 1, it will be noted that the lower edge 14 of the cup 10 is above the bottom 40 of the inner liner 32. The cup 10 is suspended in this relation by the abutment of the axially extending edge 42 of the inner liner 32 with the underside of the bead 18.

Figure 2:
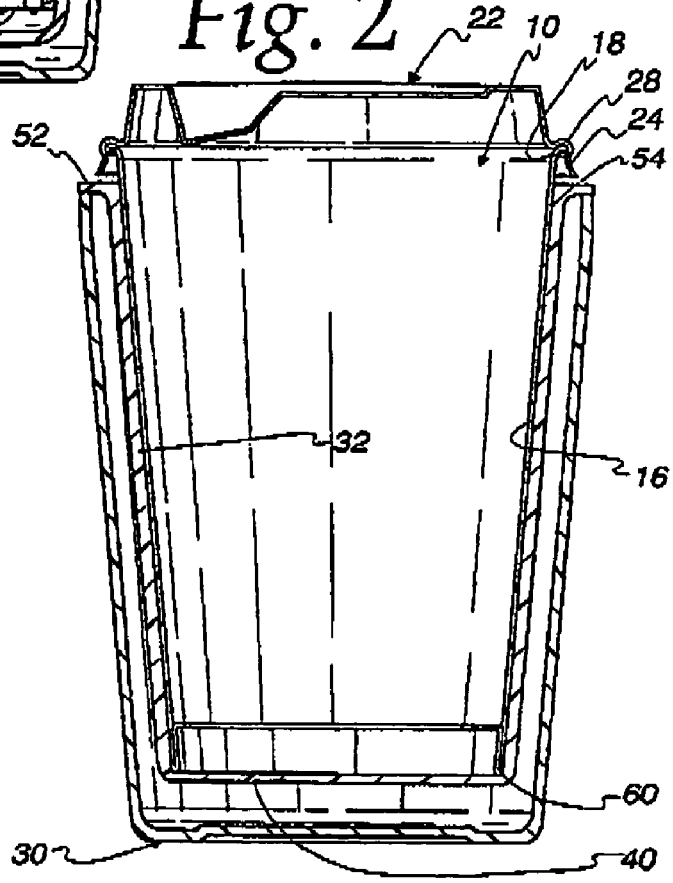
FIG. 2 is a vertical section of a modified embodiment.

FIG. 2 illustrates another embodiment of the invention which is essentially the same as that in FIG. 1 but for a couple of differences. Like reference numerals indicate like components which will not be redescribed in the interest of brevity. In this embodiment, inner liner 32 omits the axially extending edge 42 in favor of a circular access opening that is coplanar with the upper edge of the radially extending flange 52. Again, a slight gap 54 is maintained between the flange 52 and the skirt 24.

A second difference between the embodiments of FIG. 1 and FIG. 2 is the interior configuration of the inner liner 32. In this case, the bottom wall 40 supports the bottom edge 60 of the side wall 16 of the cup 10.

Figure 3:
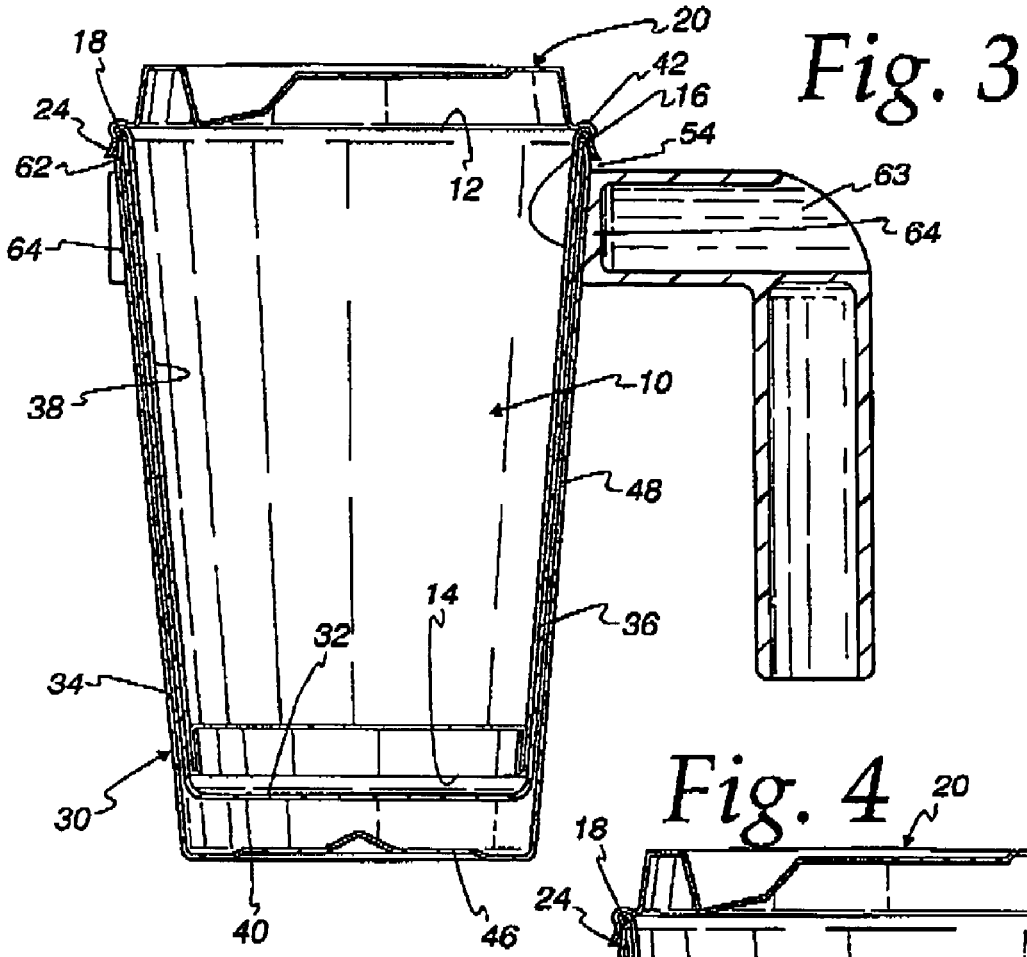
FIG. 3 is a vertical section of still a further modified embodiment.

According to the embodiment of FIG. 3, the inner liner 32 and the outer body 34 are formed of metal and typically, a vacuum will be pulled within the space 36 between the two. The cup 10 and the lid 20 therefor are of conventional construction and as described previously in connection with FIGS. 1 and 2. In this case, the upper end of the outer body 34 terminates in an axially directed edge 62 which merges with and is joined to the inner liner 32 just below its upper edge 42. The arrangement is such that the upper edge 42 engages the bead 18 of the cup 10 and supports the same with the bottom edge 14 of the cup 10 above the bottom 40 of the inner liner 32. It will be noted that the skirt 24 overlies the axially extending edges 42, 62 of the inner liner 32 and outer body 34 respectively. The embodiment of FIG. 3 includes the provision of a grip 63 in the form of an inverted L whose horizontal leg terminates in a ring-shaped band 64 that surrounds the outer shell 34 near the upper edge thereof. The grip 63 may be bonded to the outer shell by any suitable means.

Figure 4:
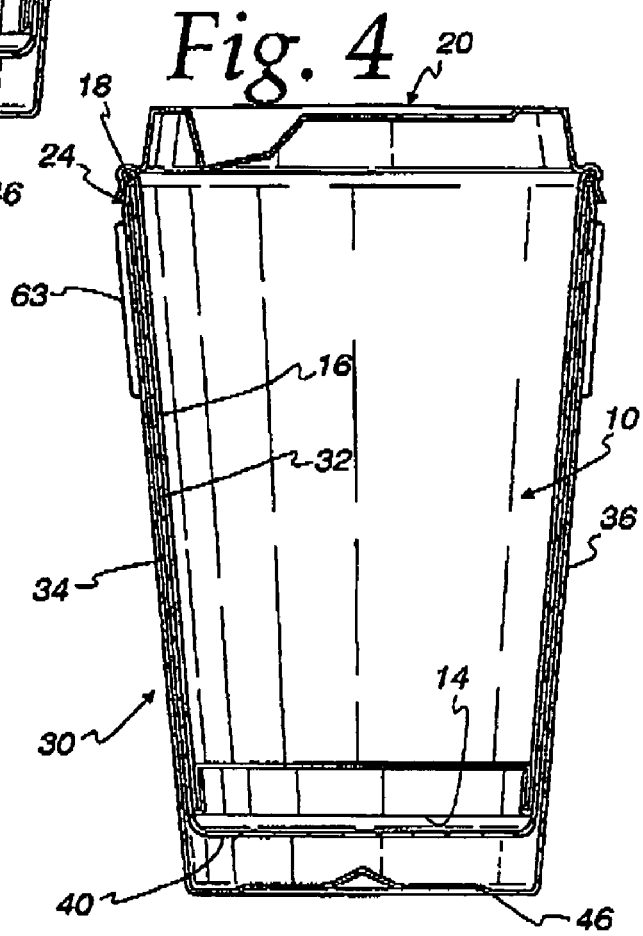
FIG. 4 is a vertical section of still a further modified embodiment.

FIG. 4 illustrates an embodiment that is generally identical to FIG. 3 except that in this case, the grip 63 is in the form of a rubber or plastic ring which may be bonded or shrink fitted to the outer shell 34, again near its upper edge and just below the terminus of the skirt 24 on the lid 20.

It should be recognized that if desired, the inner liner 32 of either of the embodiments illustrated in FIGS. 3 and 4 may be sized so that the lower edge 14 of the side wall 16 of the cup 10 may rest there against just as illustrated in FIG. 2.

From the foregoing, it will be appreciated that a cup holder for a conventional beverage cup is provided that will provide insulating qualities to a conventional cup 10 when assembled thereto so as to maintain the temperature of the beverage within the cup at a desired level. It will also be appreciated that the beverage holder is such that a conventional lid 20 may be applied to the cup 10 without interference when the cup 10 is within the holder 30 or may be removed from the cup 10 if desired. Furthermore, if the lid 20 is applied to the cup 10 prior to insertion of the latter into the holder 30, the holder 30 does not engage the lid and dislodge or partially dislodge the same from the cup 10.

We claim:

1. In combination with a disposable beverage container having a generally inverted frusto-conical side wall and an upper access opening surrounded by a radially outwardly extending peripheral bead adapted to be connected to a disposable container lid by a snap fit within a downwardly and radially outwardly depending peripheral skirt on the lid, a double walled insulating vessel including an inner liner having a frusto-conical inner surface with an upper access opening surrounded by an axially directed edge and shaped to matingly receive said container with said side wall abutting said surface about substantially its entire extent and with said edge abutted against an underside of said bead while leaving a radially outer part of said bead uncovered to be received and snap fitted within the skirt of a disposable lid, and an outer body surrounding, in spaced relation, said inner liner, said inner liner and said outer body being sealingly attached to one another just below said axially directed edge thereby defining an insulating space between said inner liner and said outer body with said outer body being in non-interfering relation to the placement of a lid on the bead of the container.

2. The combination of claim 1 wherein said axially directed edge is adapted to underlie said skirt in non-contacting relation.

3. The combination of claim 1 wherein said inner liner and said outer body are formed of metal.

4. The combination of claim 1 wherein said inner liner and said outer body are formed of plastic.

5. The combination of claim 4 wherein said inner liner includes a radially outwardly directed flange located just below said axially extending edge and said bead and said outer body is sealed to said flange.

6. The combination of claim 1 further including a grip on said outer body located near the top thereof.

7. The combination of claim 1 wherein said container is suspended within said inner liner by the abutment of said bead and said axially extending edge.

8. An insulating cup holder comprising:

an inner liner having a tapered side wall terminating in a circular access opening at a top thereof adapted to receive a cup;

a generally axially directed edge extending around the periphery of said access opening and adapted to engage a bead on a cup inwardly of a radially outer part thereof; and an outer body surrounding said inner liner in spaced relation thereto to define an insulating space therebetween;

said outer body terminating an axially directed circular edge engaging and sealed to said inner liner below the axially directed edge of said inner liner so that the upper extent of said cup holder is defined entirely by said axially directed edge of said inner liner.

9. The combination of claim 8 wherein said inner liner and said outer body are formed of metal.

10. The combination of claim 8 wherein said inner liner and said outer body are formed of plastic.

11. The combination of claim 10 wherein said inner liner includes a radially outwardly directed flange located just below said axially extending edge and said outer body is sealed to said flange.

12. The combination of claim 8 further including a grip on said outer body located near the top thereof.

13. The combination of claim 8 further including a cup suspended within said inner liner by the abutment of a bead on said cup and said axially extending edge.

[14. In combination with a disposable beverage container having a generally inverted frusto-conical side wall and an upper access opening surrounded by a radially outwardly extending peripheral bead adapted to be connected to a disposable container lid by a snap fit within a downwardly and radially outwardly depending peripheral skirt on the lid, a bottom on said container, a double walled insulating vessel including an inner liner having a frusto-conical inner surface with a bottom and an upper access opening with a circular edge and shaped to matingly receive said container with said side wall abutting said surface about substantially its entire extent and with said bottom abutted against the bottom of said container while leaving a radially outer part of said bead uncovered to be received and snap fitted within the skirt of a disposable lid, and an outer body surrounding, in spaced relation, said inner liner, said inner liner and said outer body being sealingly attached to one another thereby defining an insulating space between said inner liner and said outer body with said outer body being in noninterfering relation to the placement of a lid on the bead of the container.]

*15. The combination of claim 1 further including a grip on said outer body located near the top thereof.*

*16. In combination with a disposable beverage container having a generally inverted frusto-conical side wall and an upper access opening surrounded by a radially outwardly extending peripheral bead adapted to be connected with a disposable container lid by a snap fit within a downwardly and radially outwardly depending peripheral skirt on the lid, a double walled insulating vessel including an inner liner having a frusto-conical inner surface with an upper, beverage container receiving opening and shaped to matingly receive said beverage container with said side wall substantially abutting said inner surface about substantially its entire extent, and an outer body surrounding, in spaced relation, said inner liner and having an upper inner liner receiving opening, said inner liner and said outer body being sealingly attached to one another at a location closely adjacent said upper beverage container receiving opening and said upper inner liner receiving opening, said double walled insulating vessel including an axially directed edge closely adjacent said location and abutting an underside of said bead while leaving a radially outer part of said bead uncovered to be received and snap fitted within the skirt of a disposable lid, said inner liner and said outer body defining a insulating space with said outer body being in noninterfering relation to the placement of a lid on the bead of the container.*

*17. The combination of claim 16 wherein said axially directed edge is defined by an upper edge of said inner liner.*

*18. The combination of claim 16 further including a grip closely adjacent said location.*

*19. In combination with a disposable beverage container having a generally inverted frusto-conical side wall and an upper access opening surrounded by a radially outwardly extending peripheral bead adapted to be connected to a disposable container lid by a snap fit within a downwardly and radially outwardly depending peripheral skirt on the lid, a bottom on said container, a double walled insulating vessel including an inner liner having a frusto-conical inner surface with a bottom and an upper access opening shaped to matingly receive said container with said side wall abutting said surface about substantially its entire extent while leaving a radially outer part of said bead uncovered to be received and snap fitted within the skirt of a disposable lid, and an outer body surrounding, in spaced relation, said inner liner, said inner liner and said outer body being sealingly attached to one another thereby defining an insulating space between said inner liner and said outer body with said outer body being in noninterfering relation to the placement of a lid on the bead of the container, wherein said container is suspended within said inner liner by abutment of said bead with an upper, circular edge of said vessel.*

* * * * *